United States Patent [19]
Ogawa et al.

[11] Patent Number: 5,126,994
[45] Date of Patent: Jun. 30, 1992

[54] METHOD AND APPARATUS FOR CONTROLLING AND DETECTING RECORDING LASER BEAM

[75] Inventors: Hiroshi Ogawa, Kanagawa; Shinji Katsuramoto, Chiba; Masanobu Yamamoto, Kanagawa, all of Japan

[73] Assignee: Sony Corporation, Tokyo, Japan

[21] Appl. No.: 439,584

[22] Filed: Nov. 21, 1989

[30] Foreign Application Priority Data

Nov. 29, 1988 [JP] Japan .................................. 63-301546
Dec. 29, 1988 [JP] Japan .................................. 63-334906
Mar. 31, 1989 [JP] Japan .................................. 1-83693

[51] Int. Cl.⁵ .............................................. G11B 7/00
[52] U.S. Cl. .............................................. 369/116
[58] Field of Search ............... 369/44.13, 44.26, 44.39, 369/44.31, 44.33, 44.38, 116, 100, 109

[56] References Cited

U.S. PATENT DOCUMENTS 4,283,785  8/1981  Miyauchi et al. .
4,707,816  11/1987  Yonezawa et al. ............ 369/44.26
4,866,692  9/1989  Saito et al. ..................... 369/116
4,873,680  10/1989  Chung et al. ................... 369/116
4,894,816  1/1990  Sukeda et al. ................... 369/116
4,959,823  9/1990  Getrever et al. ................ 369/44.26
4,967,403  10/1990  Ogawa et al. .................. 369/44.26
5,001,692  3/1991  Farla et al. ..................... 369/116

FOREIGN PATENT DOCUMENTS

21145/83  11/1983  Australia .
62945/86  9/1986  Australia .
035236  9/1981  European Pat. Off. .
265695  5/1988  European Pat. Off. .
289004  11/1988  European Pat. Off. ......... 369/44.39

Primary Examiner—Donald McElheny, Jr.
Attorney, Agent, or Firm—Lewis H. Eslinger; Jay H. Maioli

[57] ABSTRACT

The control and detection of a laser beam for an optical disc recording/reproducing apparatus in which the intensity of a return laser beam reflected by an optical recording medium of a recording laser beam used for forming pits and recording data on the recording medium during the recording mode is detected and an error signal including focusing and tracking error signals of the recording laser beam is formed on the basis of a detection output of the intensity of the return laser beam within a predetermined time interval before the pit starts to be formed by the recording laser beam on the recording medium to control the recording laser beam, and in which, when recording data on the optical recording medium having sub-data previously recorded thereon as pre-grooves with wobbling, these sub-data are detected on the basis of the detection output of the return laser beam within said predetermined time interval or within a predetermined time interval other than said predetermined time interval.

13 Claims, 9 Drawing Sheets

METHOD AND APPARATUS FOR CONTROLLING AND DETECTING RECORDING LASER BEAM

FIELD OF THE INVENTION

This invention relates to a method and an apparatus for controlling and detecting a record laser beam for recording data on an optical recording medium, including output setting control of a recording light source.

PRIOR ART

Recently, a disc-shaped recording medium employed in the optical or magneto-optical signal recording and/or reproducing methods, such as an optical disc or magneto-optical disc, has been evolved and presented to the market. As such disc-shaped recording medium, there are known a read only memory or ROM type recording medium, such as a so-called compact disc, a so-called write once type recording medium, on which the user can write data once, and a rewritable or erasable recording medium on which data can be rewritten or erased, such as a magneto-optical disc.

In an optical disc recording and/or reproducing apparatus adapted for writing and/or reading data on or from the write once type disc or rewritable optical disc, recording tracks on the optical disc rotated at a constant angular or linear velocity by application of a spindle servo are scanned by a laser beam for data recording and/or reproduction, while the optical head having enclosed therein a laser diode driven by a laser driving circuit to output a laser light for data recording and/or reproduction and a photodetector for detecting the laser beam irradiated on and reflected from the disc is controlled by focusing and tracking servo control based on the detection output from the photodetector.

In such optical disc recording/reproducing system, adapted for recording and/or reproducing data by scanning the recording tracks by the laser beam, the data cannot be recorded reliably if the power of the laser beam scanning the recording tracks during the recording mode is too small. On the other hand, if the power of the laser beam scanning the recording tracks during the reproducing mode is too large, the data recorded on the recording tracks may be destroyed or otherwise affected seriously. In this consideration, there is disclosed in the Japanese Patent Specification No. JP-A-6346632 a system in which the intensity or volume of the data recording/reproducing laser beam is detected to effect feedback control of the driving circuit for the laser diode issuing the laser beam and in which an APC (Automatic Power Control) servo loop for maintaining the constant laser beam power is switched in dependence upon various operational modes to suitably switch the beam power.

Alternatively, with the above described optical disc recording and/or reproducing apparatus, the power of the laser beam used for data recording is maintained constant by strict quality control of the recording medium employed as the optical disc. Still alternatively, the operation of the laser driving circuit is controlled on the basis of laser beam power data afforded to a predetermined area of the optical disc.

Meanwhile, the optimum laser power in maintaining a sufficiently low error rate of data recorded on an optical disc depends on the characteristics of the recording medium employed as the optical disc and may fluctuate with temperatures or with the lapse of time. Some recording media may have only a narrow energy window, as shown by a solid line in FIG. 1, such that it is extremely difficult to set the laser power at a uniform value at the recording system.

When data indicating an optimum laser power is recorded on a present area or sub-code of an optical disc, not only is the hardware complicated, since the data need be detected, but also sensitivity fluctuations in the disc recording region cannot be coped with. Moreover, with too steep a threshold, it may occur that, due to impurities, such as dust and dirt, the pits cannot be formed for an extended period of time required for the laser beam to pass through these impurities.

While it may be contemplated to monitor the error flag after recording to determine the optimum laser-power, this method is unsatisfactory in real time response and tolerability for local defects of the recording medium.

In the conventional optical recording/reproducing system, in which the recording tracks are scanned by a laser beam for data recording and/or reproducing on or from the optical recording medium, the light reflected from the optical recording medium is detected by the optical head and the focusing or tracking servo control of the laser beam is performed on the basis of the detection output. Since the light reflected by the optical recording medium is modulated by the pits formed on the recording tracks of the optical recording medium, that is, the recording data, the servo system may be affected by the pits.

Also, in the above optical recording and/or reproducing system, in which the recording tracks on the optical recording medium are scanned by a recording laser beam emitted by the laser diode pulse-driven in accordance with the recording data during the record mode to form the pits to record the data, there is a time lag $\tau_0$ of approximately 300 to 400 ns from the start of the recording laser beam produced upon driving the laser diode with a recording pulse $P_{WR}$ corresponding to the recording data until the start of formation of a pit PT on the recording track, as shown in FIG. 2, such that the detection output waveform of the recording laser beam irradiated on and reflected from the recording track is also modulated with the time lag $\tau_0$. Thus the conventional servo system operating on the basis of the detection output of the reflected recording laser beam exhibits marked dependency on the pit pattern or record data formed on the recording tracks such that it becomes necessary to provide a wide dynamic range automatic gain control circuit in the servo system.

Above all, in an optical recording/reproducing apparatus making use of an optical recording medium having the modulation factor by the recording data signals equal to about 60%, which is almost as high as that of the compact disc, such as a write once type optical disc having a layer of an organic dye base optical recording medium, the pattern of pits formed on the recording tracks during the recording mode may affect the servo system thus presenting a serious problem.

In an optical disc on which guide grooves or pregrooves are formed for tracking servo purposes, it is disclosed in the Japanese Patent Specification No. JP-A-63087655 to wobble the pre-grooves to record secondary sub-data, such as the absolute time code, using the wobbling frequency component as the subcarrier. However, since the return light detected by the head during data recording is modulated with the time lag $\tau_0$, as shown in FIG. 2, absolute time code reproduction cannot be achieved satisfactorily, because the level fluctuations caused by reading the recorded pits produce low-range spectral components which in turn lower the C/N ratio of the wobbling frequency components to worsen the error rate of the absolute time code seriously.

SUMMARY OF THE INVENTION

It is therefore a primary object of the present invention to provide an optical output setting control system in which a low error rate may be maintained at the time of data recording on the optical recording medium and in which a light output of the data recording light source to the optical recording medium may be automatically controlled to an optimum state on the real time basis.

It is a second object of the present invention to provide a method and an apparatus for controlling and detecting a recording laser beam wherein, even with an optical ecording and/or reproducing apparatus employing an optical recording medium having a high factor of modulation by recording data signals, focusing servo or tracking servo may be applied reliably to the recording laser beam during the recording mode.

It is a further object of the present invention to provide a method and an apparatus for controlling and detecting a recording laser beam wherein sub-data such as time code recorded by wobbling the pre-groove may be monitored reliably.

It is a further object of the present invention to provide a method and an apparatus for controlling and detecting a recording laser beam wherein the recording laser beam may be controlled satisfactorily and the sub data may be detected reliably The drive control means for a data recording light source of the recording medium in the light output setting control system of the present invention writes data on the optical recording medium with a light pulse as the light output of the light source is increased gradually. The light output of a data recording light source is automatically controlled to an optimum state on the real time basis on the basis of the detection output of light detection means detecting the volume of the light outputted from the light source and reflected by the recording medium, in such a manner that the volume of the reflected light from the recording medium reaches a predetermined value after the lapse of a predetermined time which should lapse since the light pulse output time from the light source until the formation of the recording pit on the recording medium by the light pulse.

Thus, by application of the present invention to the recording system for the optical recording medium, the rate of occurrence of errors in data recorded on the optical recording medium may be maintained at a lower level to enable optical recording with high reliability.

In addition, according to the present invention, the intensity of the return laser beam, that is, the recording laser beam irradiated on and reflected back from the optical recording medium is detected and focusing or tracking error signals of the recording laser beam are formed on the basis of the detected intensity output of the return laser beam during the time the pits are actually formed on the recording medium by the laser beam to control the recording laser beam. The the control of the recording laser beam may be achieved satisfactorily without being affected by the pits formed in the optical recording medium.

Therefore, when the present invention is applied to an optical recording/reproducing apparatus employing an optical recording medium having a high factor of modulation by recording data, such as write-once type optical recording disc having an organic dye base optical recording layer, recording may be achieved reliably with positive focusing and tracking servo of the recording laser beam during the recording mode.

In the case of an optical recording medium on which sub-data such as absolute time data are recorded as wobbled pre-grooves, sub-data reproduction may be achieved without being affected by reading of the pits by sampling the return laser beam detection signals within the time before pit formation or the time during actual pit formation.

EMBODIMENT

Figure 1:
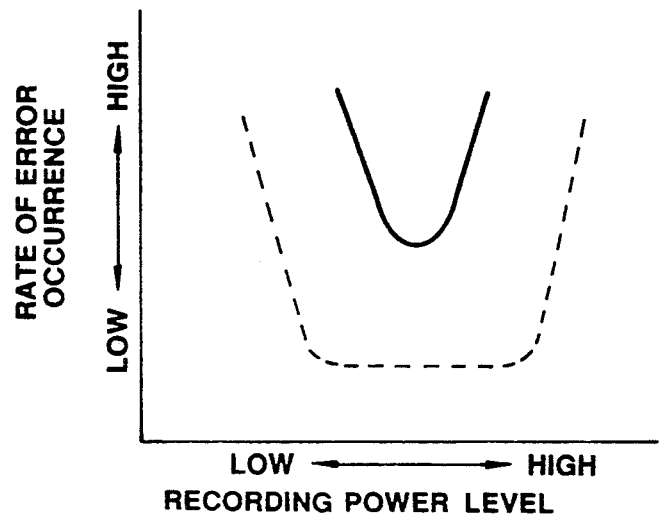
FIG. 1 is a diagram showing an energy window of the optical disc recording laser power.
Figure 2:
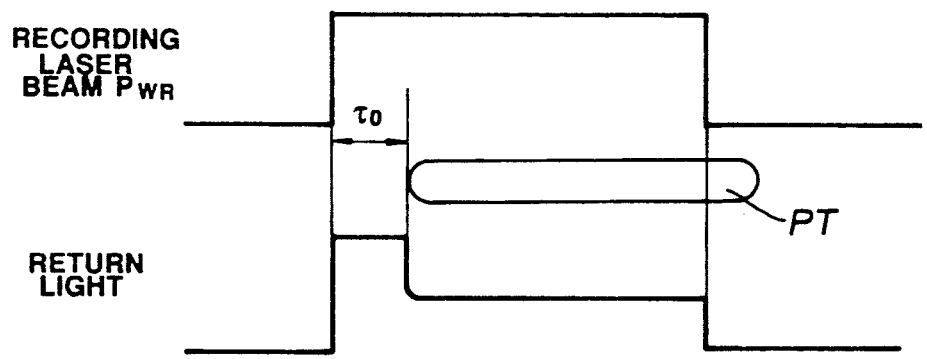
FIG. 2 is a waveform diagram showing the state of changes in the return light volume from the optical disc when forming a pit on the optical disc by the laser beam.

By referring to the drawings, a first embodiment of the present invention will be explained in detail.

Figure 3:
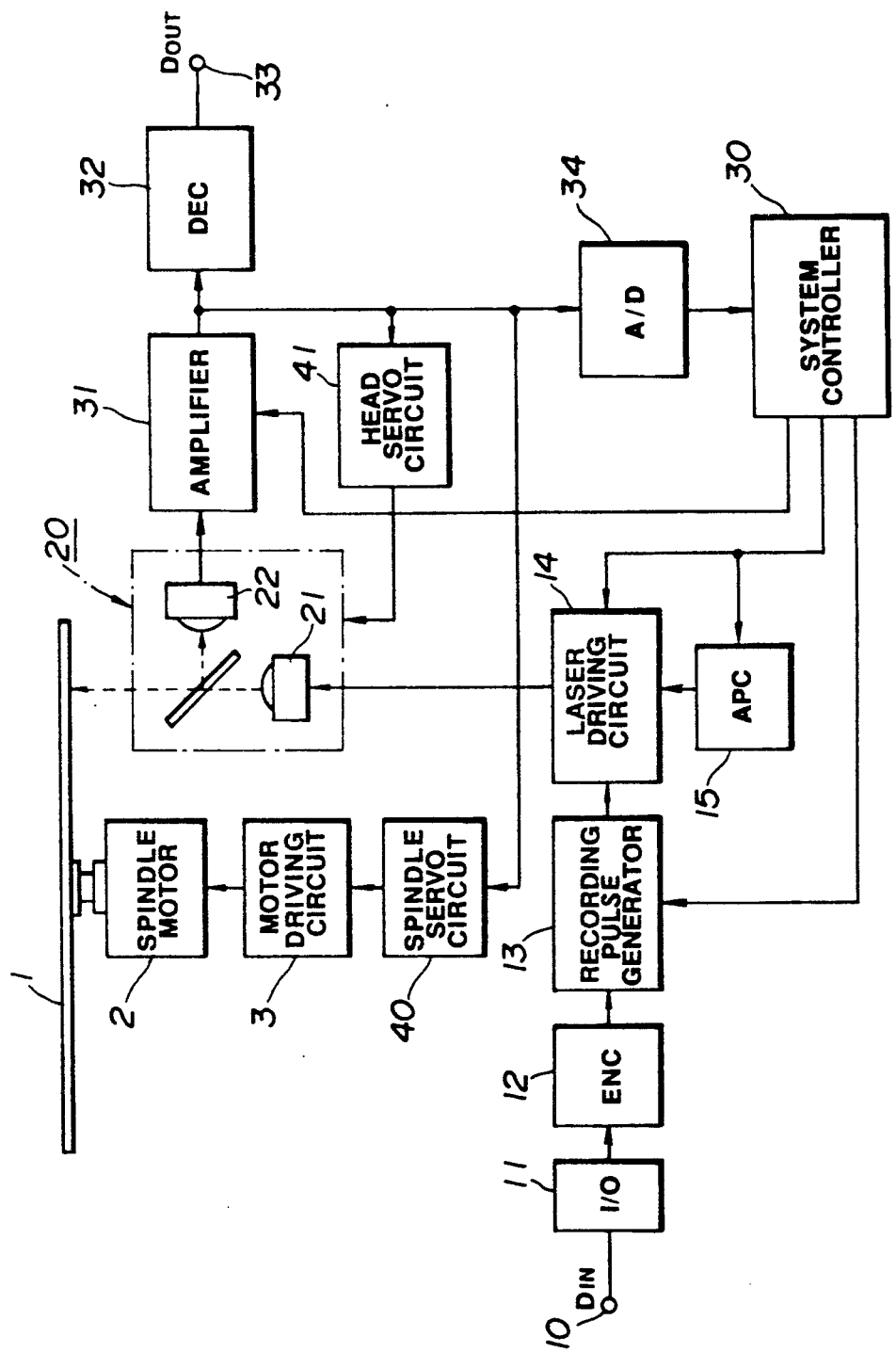
FIG. 3 is a block diagram showing the recording/reproducing system of an optical disc recording/reproducing apparatus according to a first embodiment of the present invention.

The block diagram of FIG. 3 illustrates the construction of a recording/reproducing system of an optical disc recording/reproducing apparatus to which the present invention is applied and in which an optical disc 1 provided with a write -once type optical recording medium is rotationally driven at a constant linear velocity and recording tracks on the disc 1 are scanned with a laser beam of the optical head 20 to effect optical recording and/or reproducing of digital data of a predetermined data format on or from the disc.

The optical head 20 of the optical disc recording/reproducing apparatus has enclosed therein such elements as a laser diode 21 driven by a laser driving circuit 14 to output a laser beam for digital data recording or reproducing and a photodiode 22 for detecting the laser beam radiated from the laser diode 21 and reflected by the optical disc 1. The recording tracks on the optical disc 1 are scanned by the laser beam outputted by the laser diode 21 to achieve data recording and/or reproducing on or from the recording tracks.

The recording system of the optical disc recording/reproducing apparatus includes, above all, an encoder 12 for converting recording digital data $D_{IN}$ supplied from an input terminal 10 by way of an input/output interface 11 into a recording data string of a predetermined data format and a recording pulse generator 13 for applying recording pulses corresponding to the recording data string to the laser driving circuit 14. The laser diode 21 of the optical head 20 is driven with the recording pulses corresponding to the recording data string by the laser driving circuit 14 to record the digital data $D_{IN}$ on the recording tracks of the optical disc 1 as the above mentioned recording data string of the predetermined data format.

The reproducing system of the optical disc recording/reproducing apparatus includes, above all, a decoder 32, to which detection outputs of the photodetector 22 of the optical head 20 are supplied by way of a detection amplifier 31 as RF detection signals. The detection outputs of the reflected light from the recording tracks on the optical disc 1, scanned by the laser light outputted from the laser diode 21 are subjected at the decoder 32 to a decoding operation corresponding to the encoding operation performed by the recording system to produce detection outputs which are issued by way of an output terminal 33.

The optical disc recording/reproducing apparatus is also provided with a head servo circuit 41 supplied with detection outputs by the photodetector 22 of the optical head 20 from the detection amplifier 31. Focusing and tracking errors of the laser beam are detected at the head servo circuit 41 on the basis of the detection output, that is the RF detection signal, and the biaxial actuator, not shown, adapted for driving the objective lens of the optical head 20, is controlled on the basis of these error signals to effect head servo control inclusive of focusing servo and tracking servo control operations.

The recording pulse generator 13, the laser driving circuit 14, the automatic power control(APC) circuit 15 controlling the output of the laser diode to a constant value and the detection amplifier 31 are controlled by a system controller 30 in accordance with operational modes proper to these devices.

Figure 4:
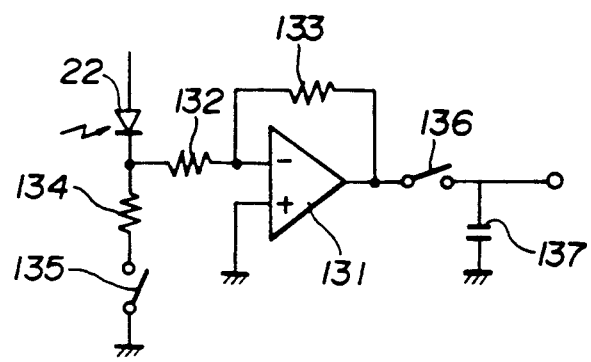
FIG. 4 is a circuit diagram showing a detection amplifier provided in the apparatus shown in FIG. 3.

The detection amplifier 31 is shown in detail in FIG. 4. That is, the detection amplifier 31 is comprised of an operational amplifier 131 having a non-inverting input terminal grounded, an inverting input terminal connected via a resistor 132 to the photodetector 22 of the optical head 20 and an output terminal connected to the inverting input terminal via a resistor 133. The point of junction between the photodetector 22 and the resistance 132 is grounded via a series circuit of a resistor 134 and a mode switch 135. The RF detection signal produced at the output terminal of the detection amplifier 31 is sampled by means of a sampling switch and held by a holding capacitor 137 before being outputted at the output terminal.

The mode switch 135 and the sampling switch 136 are controlled by the system controller 30 in the following manner.

That is, the mode switch 135 is adapted to switch the input sensitivities of the detection amplifier 31 by a mode control signal $S_{R/W}$ from the system controller 30 depending on the operational mode and is opened and closed at the time of the detection mode and the recording mode, respectively. The sampling switch 136 is closed during the detection mode to sample the RF detection signal produced at an output terminal of the detection amplifier 31 with a sampling pulse $s_{S/H}$ formed from the recording pulse corresponding to the recording data string during the recording mode at the system controller 30 to hold the sampled values at the hold capacitor 137.

During the detection mode, with the mode switch 135 opened, the total detection output current $i_R$ by the photodetector 22 of the optical head 20 flows through the resistor 133 via the resistor 132, so that, with a resistance of the resistor 132 expressed as $R_A$, a detection output voltage $V_R = R_A \cdot i_R$ is outputted from the detection amplifier 31 via the sampling switch 136.

During the recording mode, with the mode switch 135 closed, the total detection output current $i_W$ by the photodetector 22 of the optical head 20 is introduced into the detection amplifier 31, after current division by the resistors 132, 134, so that a detection output voltage $V_W$ $$V_W = \frac{R_B}{R_A + R_B} \cdot i_W$$

with $R_B$ being a resistance of the resistor 134, is outputted from the detection amplifier 31 via the sampling switch 136.

Thus, by setting the ratio of the mean laser power $P_R$ during the detection mode to the mean laser power $P_W$ during the recording mode so that $$\frac{P_R}{P_W} = \frac{R_A + R_B}{R_B}$$

the output sensitivity of the detection amplifier 31 may be rendered constant irrespective of the operational mode.

Figure 5:
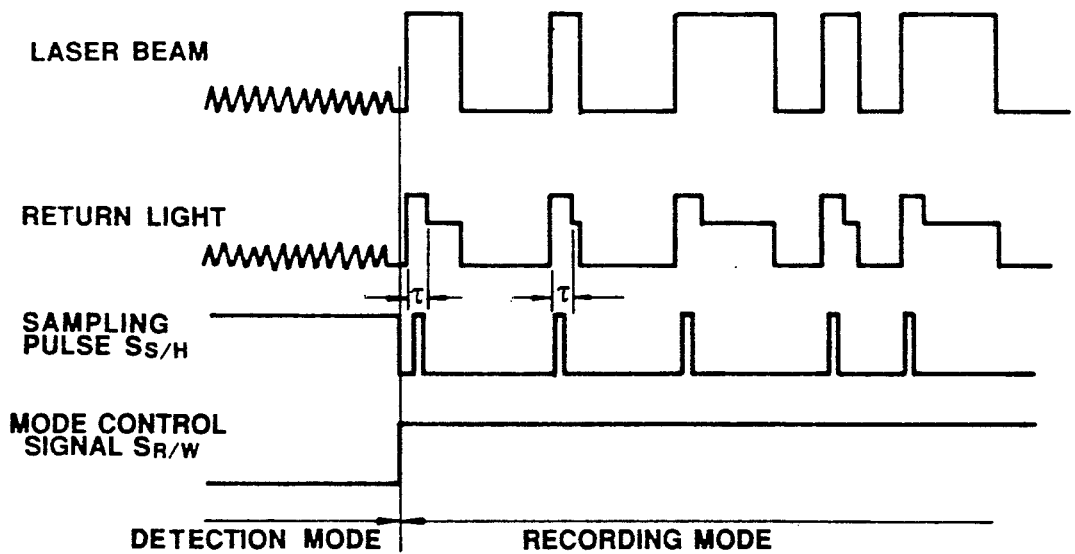
FIG. 5 is a waveform diagram for illustrating the operation of the recording/reproducing system shown in FIG. 3.

Also, during the recording mode, as shown in FIG. 5, the detection output voltage $V_W$ from the detection amplifier 31, that is the detection output by the photodetector 22 detecting the laser beam emitted by the laser diode 21 of the optical head 20 and reflected by the optical disc 1, is sampled during the recording mode by the sampling switch 136 within a range of time $\tau$ during which the pit is actually formed on the optical disc 1 by the laser beam.

The head servo circuit 41 forms, on the basis of a detection output voltage $V_W(S/H)$ sampled by the sampling switch 136 and held by the holding capacitor 137, the aforementioned laser beam focusing and tracking error signals to perform the above mentioned head control operations.

Thus, by performing the head servo control operation by forming the laser beam focusing and tracking error signals on the basis of the detection output voltage $V_W(S/H)$ obtained upon sampling the detection output by the photodetector 22 within time $\tau$ during which the pit is actually formed on the optical disc 1 by the laser beam outputted from the optical head 20 during the recording mode, the aforementioned head servo control operations can be performed without being affected by the pits formed on the optical disc 1.

In the above described embodiment, the sampling switch 136 and the holding capacitor 137 are provided at an output stage of the detection amplifier 31 and the detection output by the photodetector 22 of the optical head 20 is sample-held within the preset time $\tau$, the head servo circuit 41 performing the laser beam focusing and tracking servo control operations on the basis of the sample-held output. However, since the detection output by the photodetector 22 during the recording mode remains at the high signal level during the preset time since irradiation of the laser beam until the start of pit formation, as shown in FIG. 5, and falls to a low signal level after the lapse of the preset time $\tau$, peak holding means may be provided at an input stage to the head servo circuit 41, instead of providing sample-hold means at an output stage of the detection amplifier 31, and the peak holding means may be caused to operate during the recording mode, to produce the similar effect to that of the embodiment shown in FIG. 4. Alternatively, sample-holding means may be provided at the output stage of the error signal forming means, instead of providing sample-holding means at the output stage of the detection amplifier 31, as in the above described embodiment shown in FIG. 4, and the error signals formed on the basis of the detection output by the photodetector 22 may be sample-held by the sample holding means within the present time $\tau$ to effect the laser beam focusing and tracking servo control operations.

Figure 6:
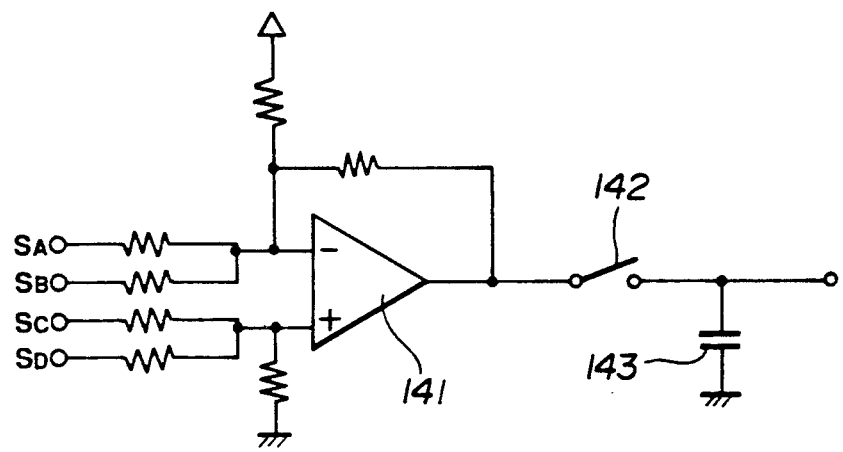
FIG. 6 is a circuit diagram showing a focusing error signal generating circuit in a head servo circuit provided in the recording/reproducing apparatus shown in FIG. 3.

FIG. 6 shows an embodiment of the head servo circuit 41 in which a sampling switch 142 and a holding capacitor 143 are provided in the output stage of an operational amplifier 141 forming the focusing error signal. The operational amplifier 141 is adapted to form the focusing error signal from four-part detector outputs $S_A$, $S_B$, $S_C$ and $S_D$ of the photodetector 22 of the optical head 20.

Inasmuch as the frequency range of the error signals formed in the head servo circuit 41 is markedly lower than that of the RF detection signal produced at the photodetector 22 of the optical head 20, the properties required of the circuit devices many be lower if the error signals are sample-held at the head servo circuit 41, instead of sample holding the RF detection signal at the output stage of the detection amplifier 31, as in the above described embodiment.

Meanwhile, in an optical disc in which pre-grooves or guide grooves are formed for tracking servo, it is known from the Japanese Patent Specification No. JP-A-6387655, to form these pre-grooves by wobble recording by wobble signals obtained by modulating sub-data such as absolute time code. When the optical disc on which the pre-grooves are formed by wobble recording is irradiated with a recording laser beam for pit formation during the recording mode, the problem is raised that optimum time code detection cannot be achieved since the waveform of the return laser beam is modulated with the time lag $\tau$ as shown in FIG. 5.

In the second embodiment of the present invention, the sub-data by the pre-grooves are detected on the basis of the detection output of the return laser beam during the preset time $\tau$ which should elapse before the pit starts to be actually formed on the optical disc by the recording laser beam, or the detection output of the return laser beam within the time interval in which the pit is actually formed.

Figure 8:
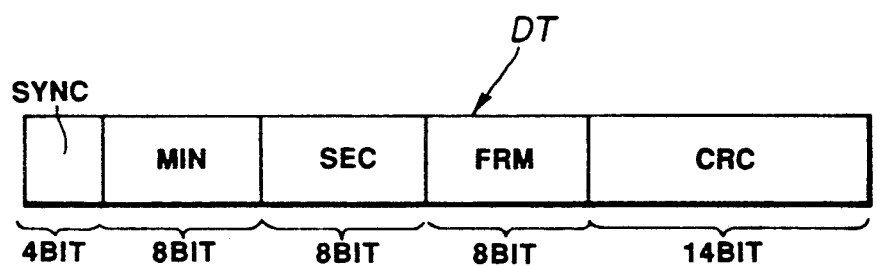
FIG. 8 is a diagrammatic view showing the absolute time data of each frame in the absolute time code.
Figure 7:
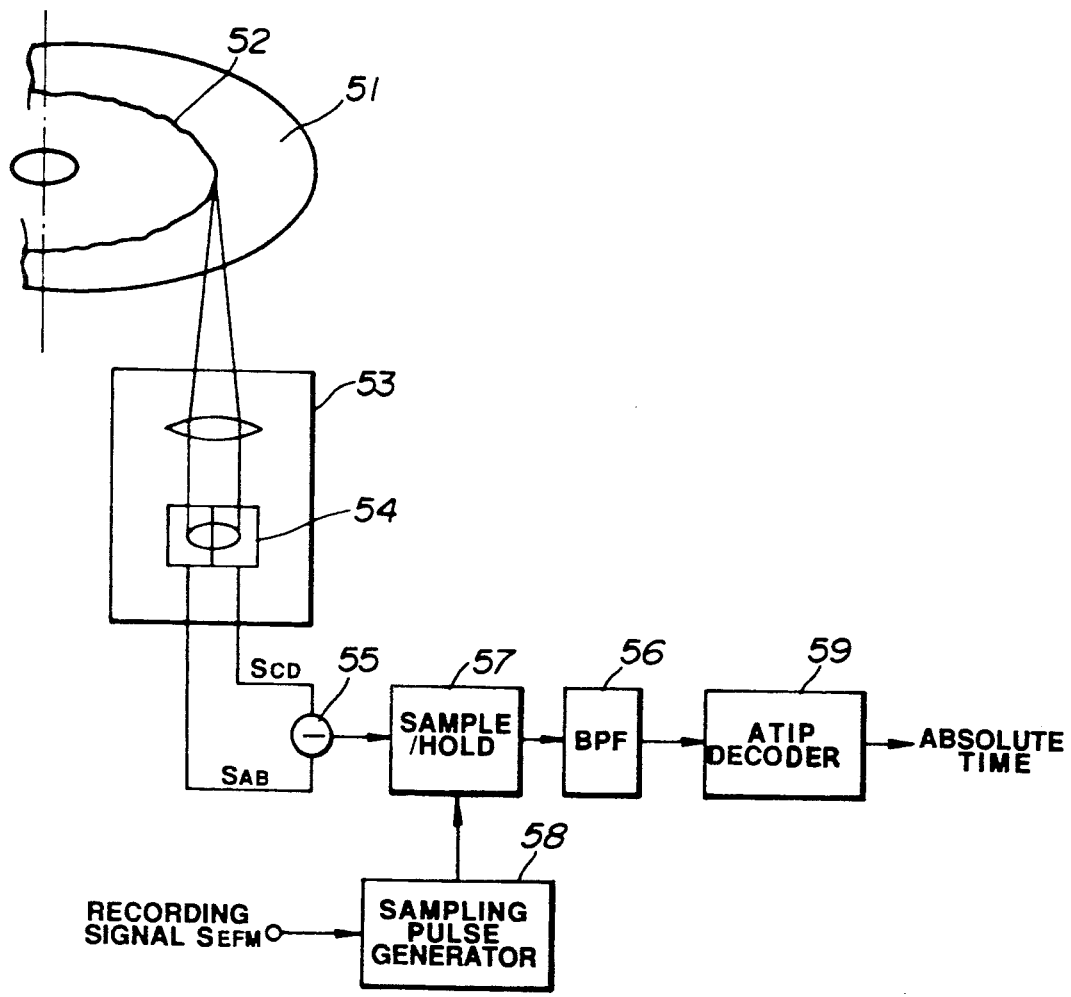
FIG. 7 is a block diagram showing a first mode of detecting sub data by the pre-grooves on the disc.

That is, in the write-once or erasable type optical disc 51 shown in FIG. 7, pre-grooves or guide grooves 52 are previously formed with wobbling at the frequency, of, for example, 22.05 kHz, for tracking servo, and the absolute time code as the sub-data is modulated by the wobbling frequency of the pre-grooves 52. Turning to a practical example of the absolute time code, it is divided into 75 Hz frames for assuring interchangeability with the compact disc CD. Each frame is associated with 42-bit absolute time data or absolute time code DT shown in FIG. 8. This absolute time data DT is made up of a 4-bit sync code SYNC, minute, second and frame data MIN, SEC and FRM each represented by 8-bit BCD code, and 14-bit error check data CRC. The absolute time data DT is formed by the NRZ code having a bit rate of 3.15 $k_{bps}$. This absolute time data is biphase mark modulated with 6.3 kHz bit clocks and the modulated signal is further frequency modulated to produce the wobbling signal which is the FM signal having a subcarrier frequency of 22.05 kHz. When preparing a master disc for a write-once or erasable optical disc, the light beam from the light source for preparation of the master disc is wobbled radially of the disc on the basis of the wobble signal for recording the absolute time code data DT of the CD format. This pre-groove recording format is called the absolute time in pregroove or ATIP format. The wobbling frequency of 22.05 kHz is selected to be affected to a laser extent by the recording data proper or EFM signal or by the servo signal.

Figure 9:
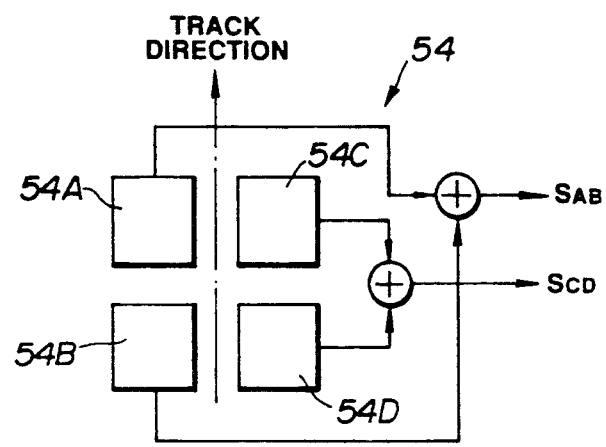
FIG. 9 is a circuit diagram of four-part photodetectors.
Figure 10:
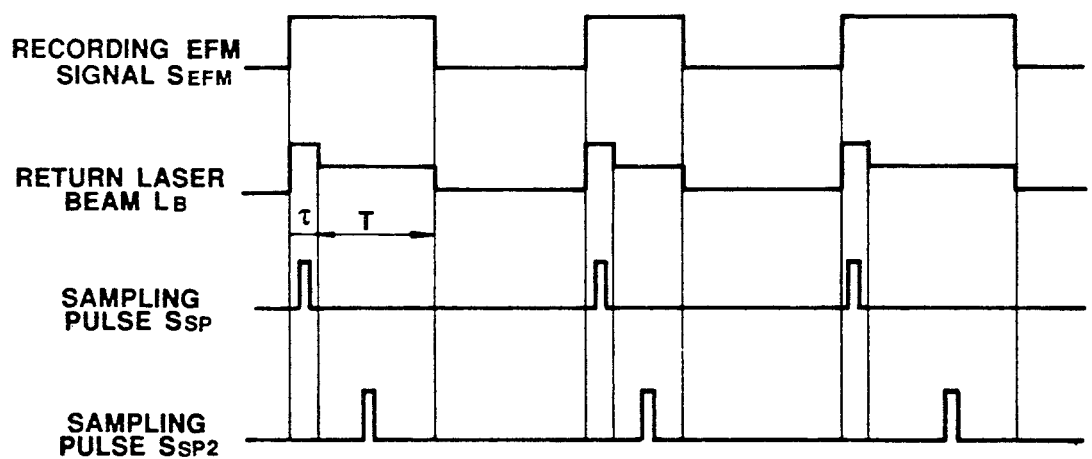
FIG. 10 is a waveform diagram showing practical examples of EFM signals, return light beam and the sampling pulse when recorded on the optical disc.

Referring to FIG. 9, a photodetector 54 of an optical head 53 shown in FIG. 7 for detecting the return laser beam has four light-receiving sections 54A, 54B, 54C and 54D slit in the track direction and in the direction orthogonal thereto. For example, the sum $S_{AB}$ of the outputs from the light receiving sections 54A and 54B and the sum $S_{CD}$ the outputs from the light receiving sections 54C and 54D are supplied to a subtractor 55 of FIG. 7. The difference of these signals $S_{AB}$ and $S_{CD}$ is taken at a subtractor 55 so that a push-pull output signal $S_{PP}$ is produced. This push-pull output signal $S_{PP}$ is supplied to a sample-hold circuit 57, to which a sampling pulse $S_{SP}$ from a sampling pulse generator 58 is also supplied and the output from the sample hold circuit 57 is supplied to a band-pass filter 56 where the wobbling frequency component of 22.05 kHz is taken out. FIG. 10 shows examples of an EFM signal $S_{EFM}$ about to be recorded, a return laser beam $L_B$ and the sampling pulse $S_{SP}$. The sampling pulse generator 58 is responsive to the inputting of the EFM signal $S_{EFM}$ to produce the sampling pulse $S_{SP}$ within the range of the preset delay time $\tau$ which should elapse before the pit starts to be formed. This sampling pulse $S_{SP}$ is transmitted to the sample-hold circuit 57 to sample-hold the push-pull output signal $S_{PP}$. The output from the band-pass filter 56 is transmitted to an ATIP decoder 59 where the absolute time or ATIP data PT is read from the wobble signal and outputted.

In the above construction, the absolute time data DT may be detected satisfactorily during the recording mode from the push-pull output of the return laser beam detection signal since the wobble signal component can be detected without being affected by the low frequency component due to reading the pits recorded on the disc 51.

When a pulse other than the sampling pulse $S_{SP}$, such as a sampling pulse $S_{SP2}$ sampling the time $\tau$ during which the recording laser beam corresponding to the EFM signal $S_{EFM}$ is irradiated for forming the pit, is employed, the wobble signal component may be detected without being affected by the low frequency components produced by reading the pits recorded on the disc 51 so that the absolute time data DT can be detected satisfactorily.

During the detection or reproducing mode of reading the pre-recorded pits, when the sum signal (RF signal) of the signal $S_{AB}$ and $S_{CD}$ is obtained, and the push-pull output signal is sampled with a sampling pulse capable of sampling a time portion indicating an unrecorded area or land of the sum signal, the wobble signal component may be detected without being affected by the low frequency components produced by reading the pits.

In the circuit of FIG. 7, the construction and the operation of the recording and reproducing system for the EFM signals are the same as those of the first embodiment of FIG. 3 and hence are not repeated for simplicity.

By way of a third embodiment of the present invention, a light output setting and control device adapted for setting a laser output when recording data on an organic dye base optical recording medium in an optical disc recording/reproducing apparatus of the first or second embodiment will be hereinafter explained.

Figure 11:
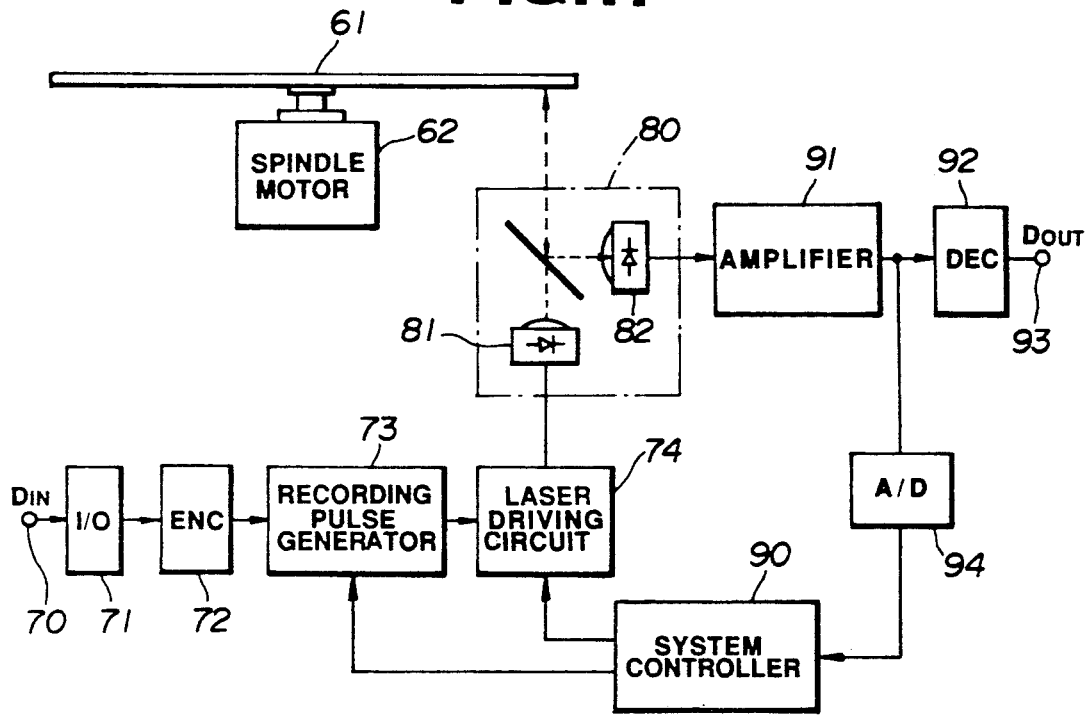
FIG. 11 is a block diagram showing a recording/reproducing system of an optical disc recording/reproducing apparatus according to a third embodiment of the present invention.

In the block diagram of FIG. 11, only those portions of a recording/reproducing system of the first embodiment of the optical disc recording/reproducing apparatus shown in FIG. 3 that are modified from FIG. 3 are shown. Also the parts or components indicated by the same numerals as those used in the first embodiment are not explained for brevity.

The block diagram of FIG. 11 shows an arrangement of a recording/reproducing system of the optical disc recording/reproducing apparatus in which digital data are optically recorded and/or reproduced on or from an optical disc 61 formed by a write-once type optical recording medium in accordance with a prescribed data format, such as the data format meeting the CD standards, by rotating the disc 61 by a spindle motor 62 at a constant angular velocity for causing the optical head 80 to scan the recording tracks of the optical disc 61 by a laser beam.

The operation of the recording pulse generating circuit 73 and the laser driving circuit 74 in the optical disc recording/reproducing apparatus is controlled by the system controller 90 to which the detection output from the photodetector 82 of the optical head 80 is supplied by way of the detection amplifier 91 and the analog-to-digital converter 94.

Figure 12:
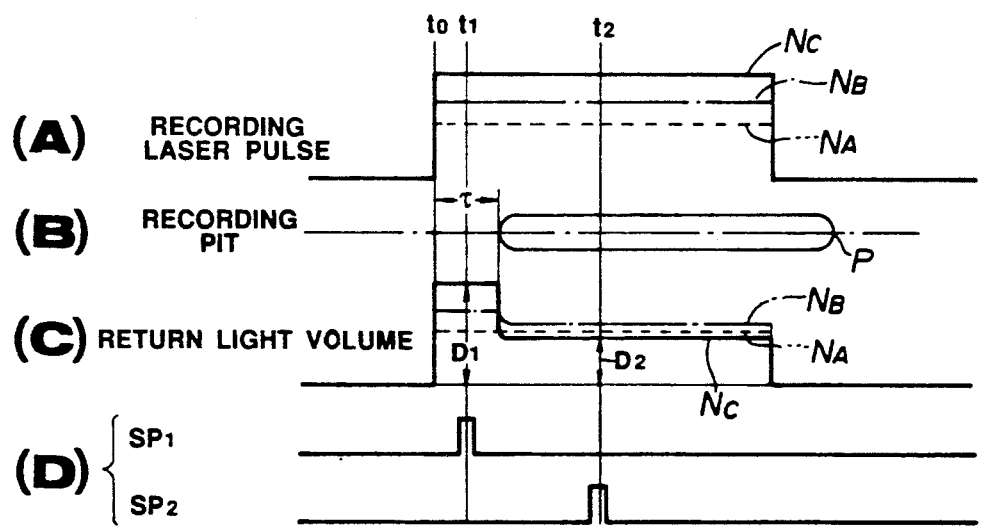
FIGS. 12(A)–(D), 13(A) through 13(C) are diagrammatic views for illustrating the recording laser power setting control operation by the system controller in the recording/reproducing apparatus shown in FIG. 3.
Figure 13:
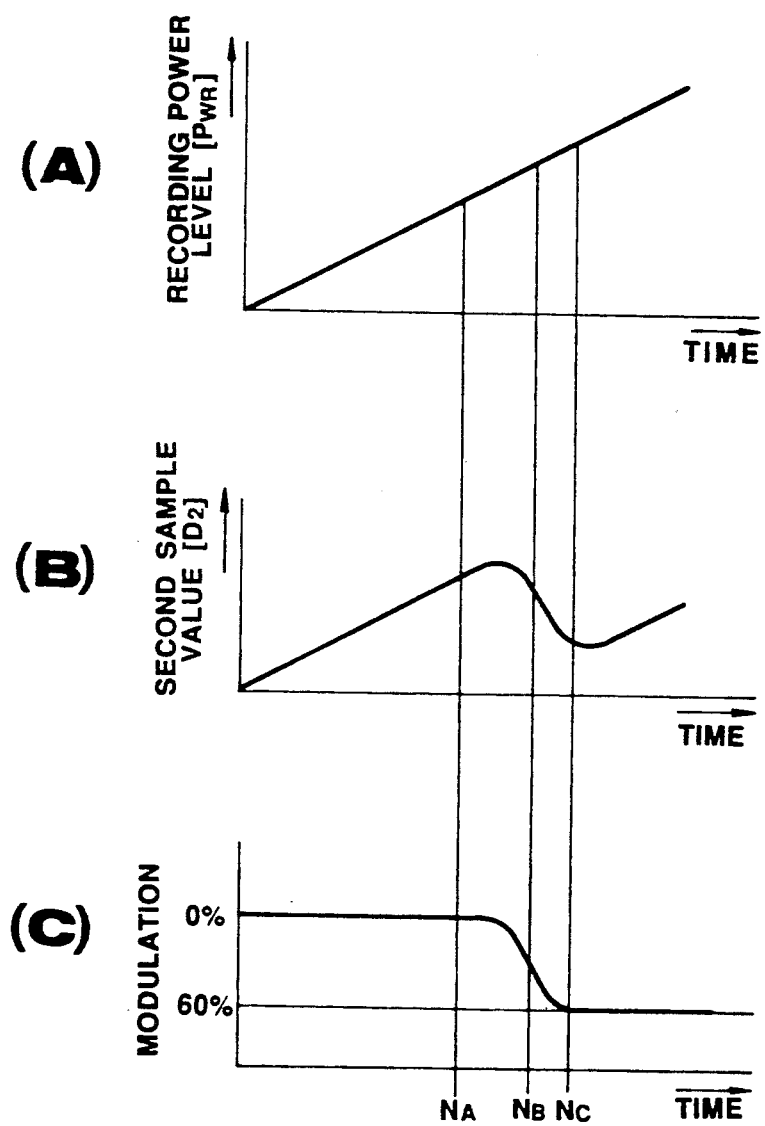
Figure 14:
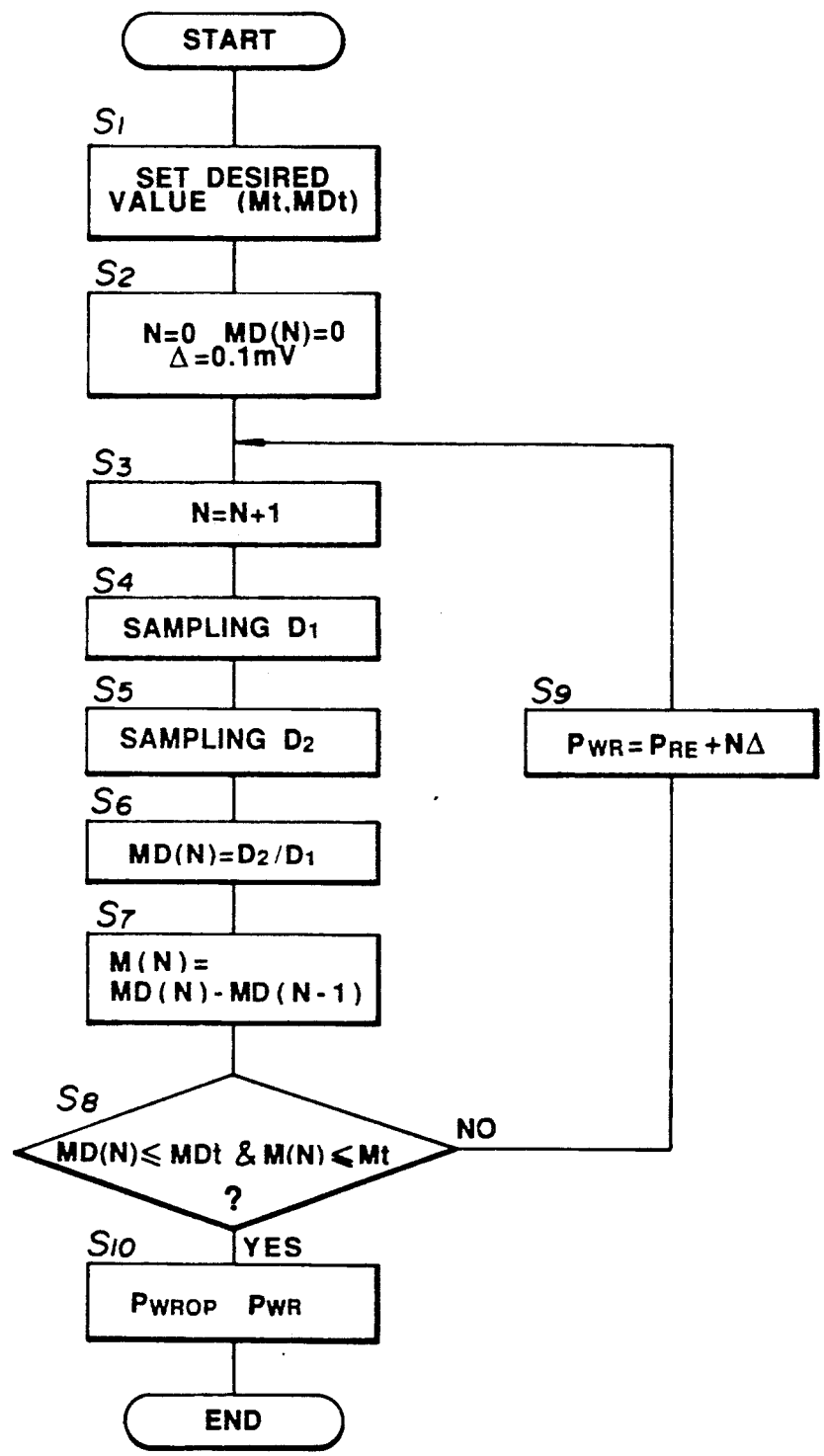
FIG. 14 is a flow chart showing the recording power setting operation by the system controller.

In the recording laser power setting mode, the system controller 90 operates to apply a recording pulse of a predetermined period from the recording pulse generator 73 to the laser driving circuit 74 to pulse-drive the laser diode 81 of the optical head 80 to raise the laser power gradually as shown in FIG. 12 and at A in FIG. 13 to effect writing on a recording track in the table of contents or TOC (Table of Content) area of the optical disc which is not in use to perform the laser power setting operation in accordance with the control sequence shown in the flowchart of FIG. 14.

When the laser diode 81 of the optical head 80 is pulse-driven to effect the recording on the optical disc with a sufficiently high recording laser power, a recording pit P is formed after lapse of a predetermined time $\tau$ since the output timing $t_0$ of the recording laser pulse as shown at B in FIG. 12. Since the reflectivity is lowered at the site of the recording pit P, the return light volume from the optical disc 61 is modulated, as shown at C in FIG. 12. When the laser diode 81 of the optical head 80 is pulse driven to raise the laser power gradually as shown at A in FIG. 13 to effect the recording on the optical disc 61, the return light volume from the optical disc 61 is increased gradually until it undergoes inflection with formation of the recording pit shown at C in FIG. 12 and at B in FIG. 13. When the recording laser power has become sufficiently high to form the recording pit P, the modulation factor of the return light volume becomes constant, as shown at C in FIG. 13.

With the present optical disc recording/reproducing apparatus, while the laser diode 81 of the optical head 80 is pulse-driven to raise the laser power gradually as shown at A in FIG. 13 to effect the recording on the optical disc 61, the return light volume from the optical disc 61 is sampled at a predetermined timing $t_1$ before the lapse of the predetermined time $\tau$ since the output timing $t_0$ of the recording laser pulse and at another predetermined timing $t_2$ after the lapse of the predetermined time $\tau$ since the output timing $t_0$. From a first sampled value $D_1$ produced by the first sampling pulse $SP_1$ and a second sampled value $D_2$ produced by the second sampling pulse $SP_2$, the point of inflection of the return light volume or the point of the constant modulation factor of the return light volume is detected, and the laser driving circuit 74 is then controlled by the system controller 90 so that the laser power at this point proves to be an optimum recording laser power.

Thus, in the flow chart of FIG. 14 showing the control sequence for the recording laser power setting operation by the system controller 90, a desired value $MD_t$ for the modulation factor MD for the return light volume by the recording pit on the disc 61 and a desired value Mt for the rate of change of the modulation factor M are set at a first step $S_1$. At the next step $S_2$, variables N and MD(N) are initialized to zero (N=0, MD(N)=0) and the step of change $\Delta$ of the recording laser power $P_{WR}$ is set for example to 0.1 mW.

At the next third step $S_3$, N=N+1 is set. At the next step $S_4$, the first sampling value $D_1$ by the first sampling pulse $SP_1$ is taken. At the next step $S_5$, the second sampling value $D_2$ by the second sampling pulse $SP_2$ is taken.

At the next step $S_6$, the modulation factor MD(N) is calculated from the sampling values $D_1$ and $D_2$ by MD(N)=$D_2/D_1$. At the next step $S_7$, the rate of change M(N) of the modulation factor MD(N) is computed from the modulation factor MD(N) computed at the step $S_6$ and the modulation factor MD(N−1) at the preceding sampling by M(N)=MD(N)−MD(N−1).

At the next step $S_8$, a decision is made as to whether the modulation factor MD(N) and the rate of change thereof computed at the step $S_6$ and $S_7$ have become smaller than the desired values MDt and Mt. If the result of decision at the step $S_8$ is NO, that is, if the modulation factor MD(N) of the return light volume is not a constant value, the program proceeds to the ninth step $S_9$ for setting the recording laser power $P_{WR}$ so that $P_{WR}=P_{RE}+N\Delta$, where $P_{RE}$ stands for the value of the read-out laser power. The program then reverts to the third step $S_3$ to repeat the operations of the third to eight steps $S_3$ to $S_8$.

By repeating the steps $S_3$ to $S_8$ by way of the ninth steps $S_9$, the laser diode 81 of the optical head 80 is pulse driven to raise the laser power gradualy to effect recording on the disc 61.

When the result of the decision at step $S_8$ is YES, that is, when the modulation factor MD(N) of the return light volume becomes constant, the program proceeds to the tenth step $S_{10}$ at which the prevailing laser power $P_{WR}$ is set as the optimum recording laser power $P_{WROP}$ to complete the recording power setting operation.

The system controller 90 controls the operation of the laser driving circuit 74 so that the recording laser power proves to be the aforementioned optimum recording laser power $P_{WROP}$ during the recording mode and so that the read-out laser power $P_{RE}$ becomes lower than the optimum recording laser power $P_{WROP}$ during the reproducing mode.

In will be noted that, although the recording laser power setting control operation is performed in the above embodiment with the use of the TOC area of the optical disc 61, it is also possible to control the laser driving circuit 74 by the system controller 90 by sampling the return light volume from the disc 61 with the sampling pulses $SP_1$, $SP_2$ during the recording operation on the recording track to maintain the optimum recording laser power $P_{WROP}$ at all times from the ratio of the first sampling value $D_1$ to the second sampling value $D_2$.

What is claimed is:

1. A method of controlling a recording laser beam comprising the steps of:
   irradiating an optical recording medium with a recording laser beam during a record mode for forming pits and thereby recording data thereon,
   detecting the intensity of a return laser beam reflected from said recording medium,
   determining a time period from the start of irradiating the optical recording medium by the laser beam until the formation thereby of a pit on the optical recording medium, and
   controlling the power of said recording laesr beam on the basis of a detection output from the step of detecting the return laser light beam intensity within the determined time period before actual pit formation on said optical recording medium by said recording laser beam.

2. The method according to claim 1 wherein the step of controlling said recording laser beam includes controlling said recording laser beam by error signals including focusing and tracking error signals of said recording laser beam formed on the basis of the detection output from the step of detecting the return laser beam intensity.

3. An apparatus for controlling a recording laser beam comprising
   a laser light source for irradiating an optical recording medium with a recording laser beam for forming pits and thereby recording data on the recording medium,
   detection means for detecting the intensity of a return laser beam reflected from said recording medium,
   means for sampling and holding a detected intensity value from said detection means during a predetermined time period from the start of irradiating the optical recording medium by the laser beam until the formation thereby of a pit in the optical recording medium, and
   control means for controlling the power of said recording laser beam on the basis of the sample-held intensity value of the return laser beam intensity within the predetermined time period before actual pit formation on said optical recording medium by said recording laser beam.

4. The apparatus according to claim 3 wherein said control means includes servo means for forming error signals inclusive of focusing or tracking error signals of said recording laser beam on the basis on the sample-held intensity value for thereby controlling the tracking and focusing of the recording beam.

5. The apparatus according to claim 4 wherein said servo means includes a peak-hold means that forms said error signals on the basis of a peak-hold output obtained by peak holding the sample-held intensity value to control said recording laser beam.

6. A method of detecting a recording laser beam comprising the steps of:
   irradiating an optical recording medium with a recording laser beam for forming pits and recording data during a recording mode, said optical recording medium having sub-data previously recorded thereon as pre-grooves with wobbling,
   detecting a return laser beam reflected from said optical recording medium,
   determining a time period from the start of irradiating the optical recording medium by the laser beam until the formation thereby of a pit in the optical recording medium, and
   detecting said sub-data formed by said pre-grooves on the basis of a detection output of said return laser beam during the determined time period before the pit starts to be formed on said optical recording medium by said recording laser beam or following the determined time period when the pit is being formed on said optical recording medium.

7. An apparatus for detecting a recording laser beam comprising
   a laser light source for irradiating an optical recording medium with a recording laser beam for forming pits and thereby recording data on the optical recording medium, said optical recording medium having sub-data previously recorded thereon as pre-grooves with wobbling,
   detection means for detecting a return laser beam reflected by said optical recording medium during recording, and
   sub-data detection means for detecting said sub-data formed by said pre-grooves on the basis of a detection output of said return laser beam and including sample-hold means for sample-holding a detected intensity value from said detection means during a predetermined period of time from the start of irradiating the optical recording medium by the laser beam until the commencement of the formation thereby of a pit on said optical recording medium by said recording laser beam or following the predetermined period of time while the pit is being formed on said optical recording medium.

8. The apparatus according to claim 7 wherein said detection means includes a pair of light receiving sections each of which is divided into at least two portions in a direction parallel to the tangential direction of said pre-grooves, so that differential outputs are obtained from each of said pair of light receiving sections.

9. The apparatus according to claim 7 wherein said sub-data detection means comprises filter means for taking out only components based on the wobbling of said pre-grooves from an output of said detection means and being fed to said sample-hold means for sample-holding an output of said filter means on the basis of sampling pulses produced during said predetermined period of time before the pit starts to be formed on said optical recording medium by said recording laser beam or following the predetermined period of time while the pit is formed on said optical recording medium, and decoding means for reproducing the sub-data from the output of said sample-holding means.

10. A light output setting and controlling apparatus comprising
a light source for irradiating an optical recording medium and thereby writing data as pits thereon,
photodetector means for detecting a volume of the light output from said light source and reflected to said photodetector means by said optical recording medium, and
controlling means for controlling the power of the light output from said light source on the basis of a detection output by said photodetector means during a predetermined period of time from the start of irradiating the optical recording medium by the light source until the formation thereby of a pit on the optical recording medium,
said controlling means driving said light source with pulses to increase the light output power of said light source gradually, said controlling means controlling the light output of said light source so that the reflected light of a predetermined light volume is detected by said photodetector means after the lapse of said predetermined period of time.

11. The apparatus according to claim 10 wherein said light source is controlled by said controlling means on the basis of a first output from said photodetector means produced before said predetermined period of time elapses and a second output from said photodetector means following the lapse of said predetermined period of time.

12. The apparatus according to claim 11 wherein said controlling means includes means for computing a modulation factor of the light volume of the reflected light from said optical recording medium on the basis of said first and second outputs from said photodetector means, compares the computed value of the modulation factor and the desired value of the modulation factor and controls said light source on the basis of the results of comparison.

13. The apparatus according to claim 12 wherein said means for computing computes the rate of change of the modulation factor of the light volume of the reflected light from said optical recording medium on the basis of the first and second outputs, compares the computed value and the desired value of the modulation factor and controls said light source on the basis of the results of comparison.

* * * * *